United States Patent [19]

Vecchiarino

[11] Patent Number: 5,481,931

[45] Date of Patent: Jan. 9, 1996

[54] DEVICE FOR THE ADJUSTMENT OF THE ORIENTATION OF DOOR MIRRORS IN MOTOR VEHICLES

[75] Inventor: Luigi Vecchiarino, Vaprio D'Adda, Italy

[73] Assignee: Commer S.p.A., Salerno, Italy

[21] Appl. No.: 145,129

[22] Filed: Nov. 3, 1993

[30] Foreign Application Priority Data

Nov. 4, 1992 [EP] European Pat. Off. ............. 92830608

[51] Int. Cl.$^6$ ................................................ B60R 1/06
[52] U.S. Cl. .................... 74/89.14; 74/424.6; 74/490.10; 248/476; 359/877
[58] Field of Search .................... 74/89.14, 424.6, 74/479 PP, 490.1; 359/877, 876, 872; 439/926, 928; 248/481, 479, 476; 310/71

[56] References Cited

U.S. PATENT DOCUMENTS

| | | | |
|---|---|---|---|
| 4,114,988 | 9/1978 | Enomoto | 350/289 |
| 4,477,150 | 10/1984 | Usami et al. | 350/289 |
| 4,930,370 | 6/1990 | Yoshida | 74/502.1 |
| 5,216,305 | 6/1993 | Strobl | 310/71 |
| 5,226,034 | 7/1993 | Nagayama et al. | 359/877 |
| 5,305,144 | 4/1994 | Mori et al. | 359/877 |

FOREIGN PATENT DOCUMENTS

| | | | |
|---|---|---|---|
| 0059073 | 9/1982 | European Pat. Off. | |
| 0321716 | 6/1989 | European Pat. Off. | |
| 59-167346A | 9/1984 | Japan | 359/877 |
| WO89/01426 | 2/1989 | WIPO | |

Primary Examiner—Charles A. Marmor
Assistant Examiner—Troy Grabow
Attorney, Agent, or Firm—Millen, White, Zelano, & Branigan

[57] ABSTRACT

A device for the adjustment of the orientation of door mirrors in motor vehicles is provided with electric motors to drive, through two reduction units, a support of the door mirror. A first reduction unit comprises a worm screw and a gear wheel integral to a second worm screw of the second reduction unit. A rack, coupled with the second worm screw, is engaged on a pivot integral to the support. A couple of tabs makes easier the assembling of rack and avoids its possible disengagement from the pivot.

Furthermore, the pecular configuration of the motors and of the electric connections of same with an external power supply avoids the need of welding to perform connection during the device assembling.

10 Claims, 2 Drawing Sheets

5,481,931

1

DEVICE FOR THE ADJUSTMENT OF THE ORIENTATION OF DOOR MIRRORS IN MOTOR VEHICLES

BACKGROUND OF THE INVENTION

FIELD OF THE INVENTION

The present invention concerns a device to adjust the orientation of door mirrors in motor vehicles by means of electric motors. Said devices, known for long time, generally foresee the presence of two electric motors that, through appropriate means of motion transmission, control the movement, in respect of two reciprocally perpendicular axes, of a support of the reflecting element. The means of motion transmission generally comprise a cascade of gears with one or more friction devices inserted therein in order to avoid, in case of mirror displacement due to forces acting on the reflecting surface, the reverse motion transmission through said cascade of gears, with possible damages to gears and motors.

An example of said embodiments is described in the patent application N. MI 91A002201 filed by the Applicant, where the gears relating to each motor comprise at least a gear housed within a support that has the function of centering and friction element. This solution, though proving reliable, is nonetheless complicated and cumbersome, therefore involving high costs to fabricate and assemble the different elements.

OBJECTS OF THE INVENTION

The object of the present invention is that of solving the aforesaid problems by providing a device to adjust the orientation of door mirrors for motor vehicles, which proves to be of easy and reliable construction and results in it being more easily and economically manufacturable.

SUMMARY OF THE INVENTION

Said object is achieved by means of the present invention that concerns a device for the adjustment of the orientation of door mirrors for motor vehicles of the type comprising a base accommodating a couple of electric motors whose shafts are connected through motion transmission means with a support of said mirror, characterized in that each of said motion transmission means comprises at least a first worm screw and gear wheel reduction unit, as well as a second reduction unit consisting of a second worm screw coupled with a rack, said second worm screw being integral and coaxial to said gear wheel.

According to a preferred feature of the invention, the second worm screw and the gear wheel are made in a single piece.

The invention will be now described in more detail with reference to the accompanying drawings given by way of illustrative and non limiting example, wherein:

2

Figure 4:
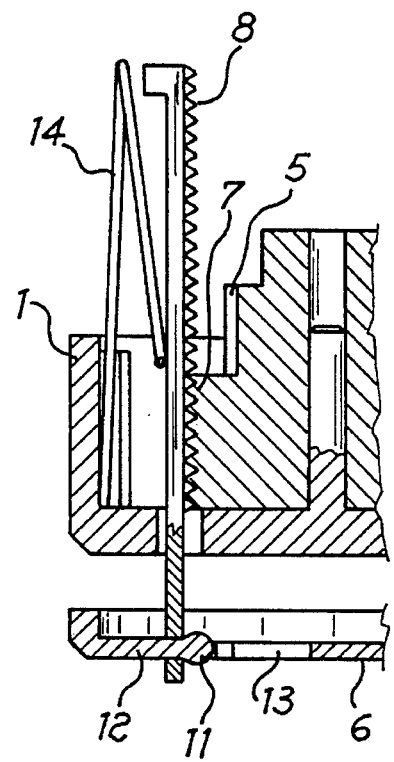
Figure 4A:
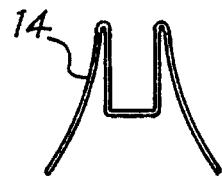

FIG. 4 is a magnified cross sectional view of a detail of the device according to the invention;

FIG. 4a is a front view in reduced scale of a detail of FIG. 4; and

Figure 5:
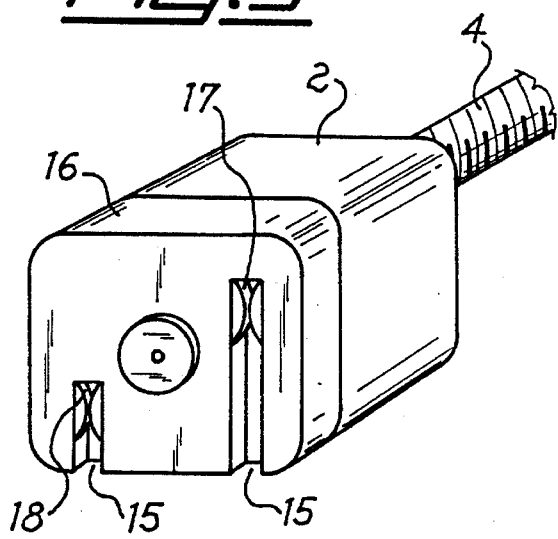

FIG. 5 is a magnified perspective view of an electric motor according to the preferential embodiment of the device.

DESCRIPTION OF THE PREFERRED EMBODIMENTS

Figure 1:
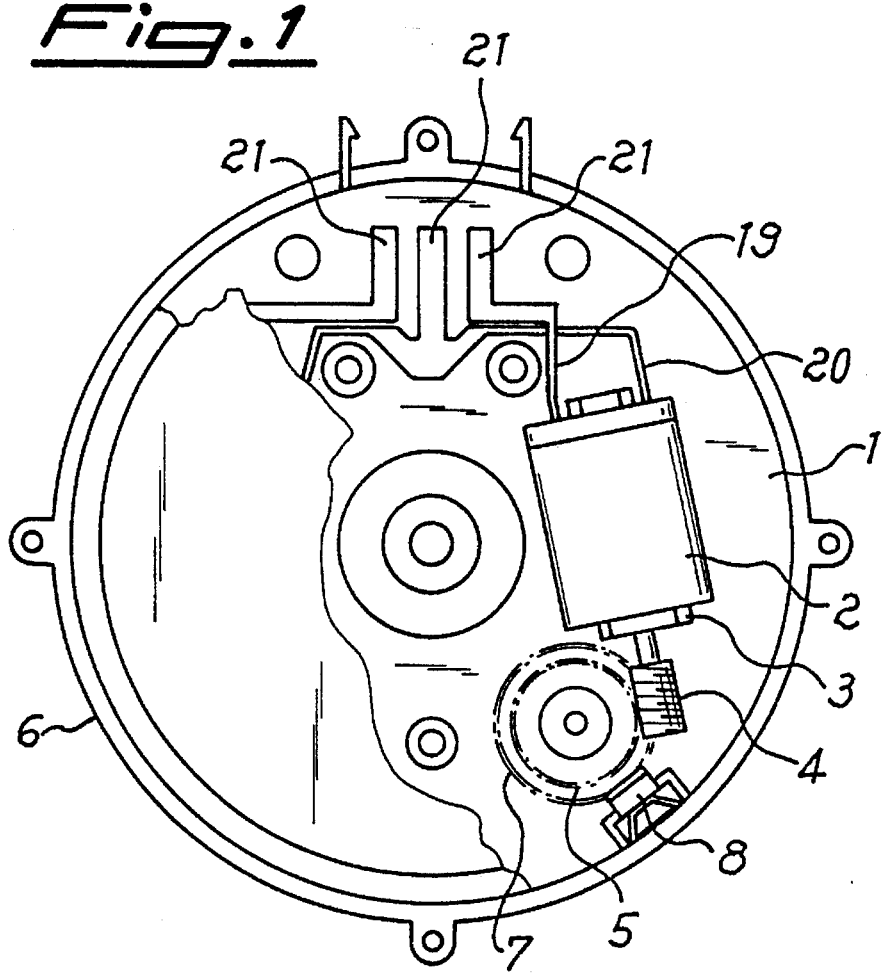
FIG. 1 is a plan view of the device according to the invention with partial removal of the cover of the housing base.
Figure 2:
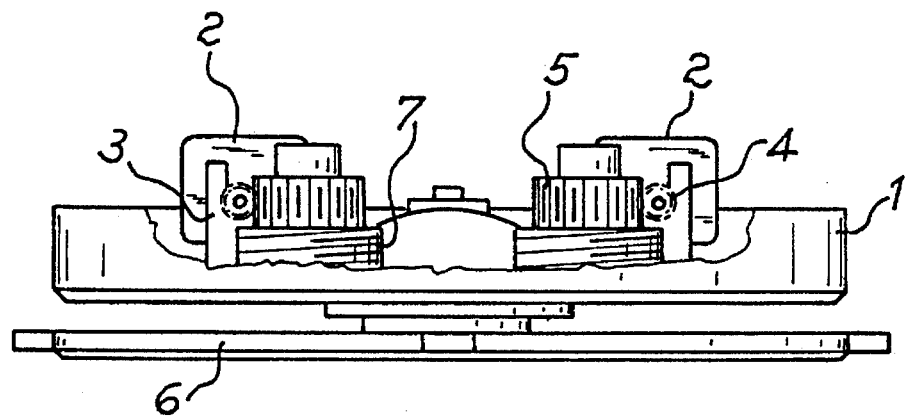
FIG. 2 is a front view of the device of FIG. 1 without the cover, with partial removal of the side surface of the housing base.

With reference first of all to FIGS. 1 and 2, the device to adjust the orientation of a door mirror comprises a base 1 that accommodates therein two electric motors 2 in correspondence to relevant seats 3. On the shaft of each motor 2 a worm screw 4 is keyed that, together with a gear wheel 5, constitutes a first reduction unit in the motion transmission from the housing base 1 to a support 6, on which the door mirror is in turn mounted in a known way.

Figure 3:
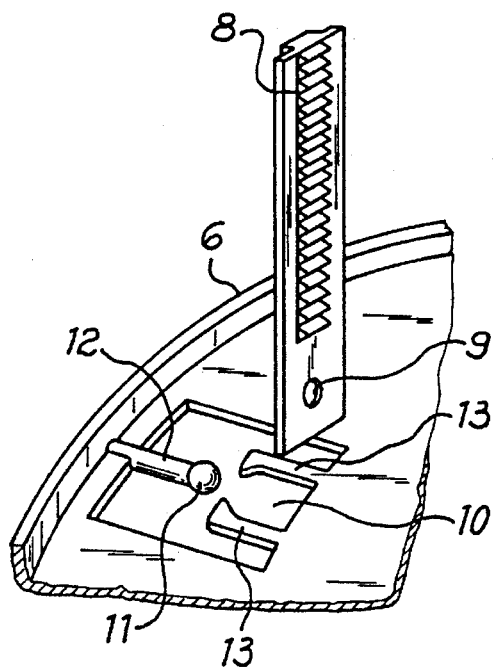
FIG. 3 is a magnified perspective view of a detail of the device according to the invention.

The connection with the support 6 comprises, for each motor, a second reduction unit constituted by a second worm screw 7, integral to the gear wheel 5 of the first reduction unit, coupled with a rack 8 (FIGS. 3 and 4). Two racks 8 are then provided that, according to a configuration well known in the technique, are mutually offset by 90 degrees to allow the oscillation of the support 6 in respect of two mutually perpendicular axes. As illustrated more in detail in FIGS. 3 and 4, each rack 8 is pressure tightened on the support 6 inserting it into a mounting seat 10 and engaging an end hole 9 on a pivot 12. The latter is radially oriented towards the centre of the support 6 and presents on one of its ends a spherical projection 11 that retains the rack 8 on the pivot 12.

Inside the seat 10, in opposite position in respect of the pivot 12, a couple of tabs 13 are provided. Said tabs have the double function of making the assembling of the rack 8 easier by guiding it towards the pivot 12, as well as of subsequently avoiding the possible uncoupling between rack and pivot thanks to appropriate projections provided at the ends of the tabs themselves.

FIG. 4 illustrates a cross sectional view that more clearly shows the connection between the housing base 1 and the support 6 by means of the reduction gears.

Elastic means are advantageously envisaged, such as for instance a spring 14, inserted within the housing base 1 to maintain the coupling between the second worm screw 7 and the rack 8. In the preferred embodiment of the invention the spring 14 has a configuration similar to that illustrated in FIG. 4a. The spring 14 has also the function of safety friction to allow the manual angular adjustment of the door mirror. In this case in fact the toothed portion of the rack 8 is disengaged from the corresponding helicoidal toothing of the second worm screw 7, against the action of the spring 14, due to the stress deriving from manual adjustment.

FIG. 5 illustrates a further advantageous feature of the invention. In order to make the assembling of the electric motors 2 easier, each of said motors is provided with a couple of slots 15 parallely located on the closing bottom 16 or back of the electric motor that is on the opposite side in respect of the shaft on which the worm screw 4 is keyed. The slots 15 accommodate the contacts 17 and 18 for the power supply to the motor 2 which slide into the slots 15 in a direction normal to the shafts of the motors.

In the preferred embodiment of the invention, the contacts 17, 18 are electrically insulated between one another by making the closing bottom 16 in a non eletroconductive material, for example plastic material.

The peculiar configuration of the electric contacts 17, 18 allows to perform the assembling and electric connection of each motor 2 by simply inserting the latter into its own seat and avoiding therefore connection welding. In fact, in correspondence to the position that the contacts 17, 18 will occupy on the finished assembly, there are provided the ends 19 and 20 (FIG. 1) of the conductive segments that electrically connect the motors 2 with an external power supply through the contacts 21 (FIG. 1).

I claim:

1. In a device for the adjustment of the orientation of a door mirror for motor vehicles, of the type comprising a base accommodating a couple of electric motors each of whose shafts are connection by reduction units and a rack to a support for said door mirror, wherein the improvement comprises: for each motor at least a first worm screw and gear wheel reduction unit driven by the motor, as well as a second worm screw having a worm threat coupled directly to the rack, said second worm screw being integral and coaxial to said gear wherein operation of said electric motors moves said racks; each of said racks being provided at one of its ends with an unelongated hole which engages in a loose way a separate pivot provided within an assembling seat present in said support for the door mirror; each of said pivots being radially oriented to project towards the center of said support and presenting a spherical projection at one of its ends, whereby said racks adjust said door mirror upon being driven by said motors.

2. A device according to claim 1, characterized in that said second worm screw and said gear wheel are made in a single piece.

3. A device according to claim 1, characterized in that elastic elements are inserted in said housing base to elastically and detachably retain the coupling between said second worm screw and said rack.

4. A device according to claim 1, characterized in that each of said electric motors has a back on a side opposite the shaft, the back being provided with a couple of parallel slots for effecting an electrical connection.

5. A device according to claim 4, characterized in that said slots accommodate reciprocally insulated electric contacts for receiving additional contacts in a direction normal to the shafts.

6. A device according to claim 1, characterized in that the power connections for said electric motors comprise a plurality of stiff segments made of electroconductive material fixed to said housing base, said segments being capable of engaging with their ends in correspondance to said electronic contacts present in said slots.

7. A device according to claim 4, characterized in that the power connection for said electric motors comprise a plurality of stiff segments made of electroconductive material fixed to said housing base, said segments being capable of engaging with their ends in correspondance to said electric contacts present in said slots.

8. A device according to claim 5, characterized in that the power connections for said electric motors comprise a plurality of stiff segments made of electroconductive material fixed to said housing base, said segments being capable of engaging with their ends in correspondance to said electric contacts present in said slots.

9. In a device for the adjustment of the orientation of a door mirror for motor vehicles, of the type comprising a base accommodating a couple of electric motors each of whose shafts are connected by reduction units and a rack to a support for said door mirror, wherein the improvement comprises: for each motor at least a first worm screw and gear wheel reduction unit driven by the motor, as well as a second worm screw having a worm thread coupled directly to the rack, said second worm screw being integral and coaxial to said gear wheel wherein operation of said electric motors moves said racks; each of said racks being provided at one of its ends with an unelongated hole which engages in a loose way a separate pivot provided within an assembling seat present in said support for the door mirror, and a couple of tabs being provided within said assembly seat opposite said pivot, the tabs guiding the racks into engagement with the pivots.

10. A device according to claim 9, characterized in that said tabs are provided at their own ends with projections capable of preventing said rack from disengaging from said pivot.

* * * * *